No. 611,651. Patented Oct. 4, 1898.
G. L. ROBY.
HAND CULTIVATOR.
(Application filed Feb. 3, 1898.)
(No Model.)

WITNESSES.
J.P. Armstead.
Geo. R. Wyman

INVENTOR.
Geo. L. Roby

UNITED STATES PATENT OFFICE.

GEORGE L. ROBY, OF GRAND HAVEN, MICHIGAN, ASSIGNOR TO THE GALE MANUFACTURING COMPANY, OF ALBION, MICHIGAN.

HAND-CULTIVATOR.

SPECIFICATION forming part of Letters Patent No. 611,651, dated October 4, 1898.

Application filed February 3, 1898. Serial No. 668,920. (No model.)

*To all whom it may concern:*

Be it known that I, GEORGE L. ROBY, a citizen of the United States, residing at Grand Haven, in the county of Ottawa and State of Michigan, have invented certain new and useful Improvements in Hand-Cultivators, set forth in the following specification.

My invention relates to improvements in that class of machines used in cultivating the soil by hand upon one or both sides of the plants each time, as desired; and it consists of a mechanism whereby the width between the cultivating-shovels can be quickly adjusted, remaining flexible or locked rigid, as desired.

Figure 2:
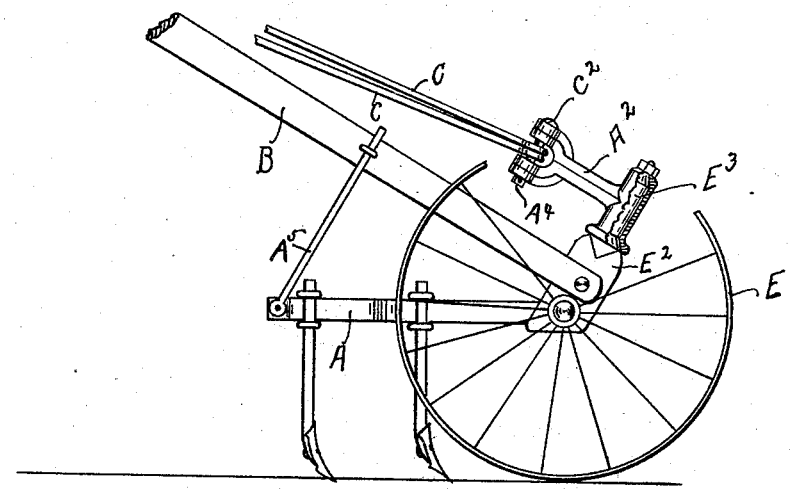
Figure 1:
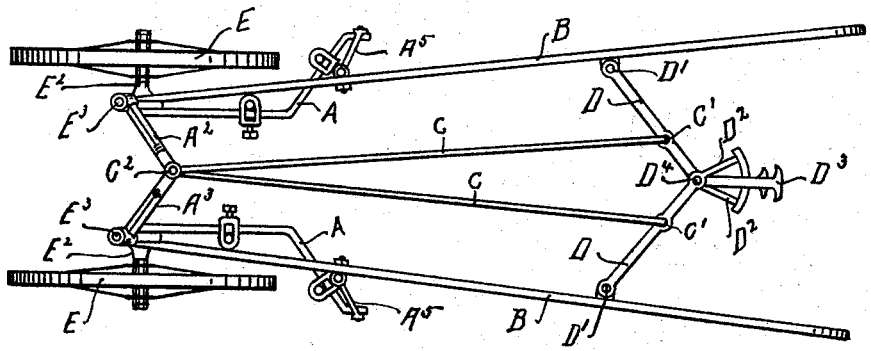

Figure 1 is a plan view of the frame. Fig. 2 is a side view, partly sectional.

Similar letters refer to similar parts throughout both views.

In the machine invented by me the frame to which the cultivating-teeth are to be attached is made in two self-contained sections, consisting of the wheel E, spindle-holder $E^2$, handle B, bars or gangs A, and brace $A^5$. Projecting upward from the juncture of the handle B and spindle-holder $E^2$ is a round spindle or shaft $E^3$, over which a sleeve on the casting or arms $A^2$ and $A^3$ fit, so that they may rotate thereon, and which is held in any suitable manner. The two arms $A^2$ and $A^3$ are designed to pivot together at $C^2$ in such a manner that the two rods or connections C C may also be fastened to work on a center common to such pivot, which is preferably held in position by a bolt or pin $A^4$.

At or near the upper end of the handles B B when the operator takes hold of the machine there is pivoted thereto in any suitable manner at D' D' two arms D D, having pivots or joints at C' C' for connecting them to the pivot $C^2$, by means of the rods or connections C C, said arms D D being also pivoted together at $D^4$. Extending outwardly from the pivot or joint $D^4$ there may be arranged two segments $D^2 D^2$ for locking these several joints from movement by means of a clutch $D^3$.

The distance from the center of $E^3$ to the center of the pivot or joint at $C^2$ is exactly the same, or nearly so, as the distance from D' to C', and the distance from C' to $C^2$ is approximately the same distance as D' is from $E^3$. It will then be seen that the movement of any one of these parts will cause a corresponding movement in all the other parts connected thereto necessary to keep the wheels E E and gages A A in a parallel position and that the triangular figure formed by the pivots $C^2$, C', and $D^4$ of each half form a truss, which prevents any longitudinal movement of the two parts of the frame in their relation with each other; but if the clutch $D^3$ is released they may be brought together or expanded outward either by pressure in a lateral direction on the handles B B or longitudinal on the pivot or joint $D^4$; but otherwise the different parts are rigid and unmovable and can be locked so by use of the clutch $D^3$ or screw-joint at any of the pivots, as shown.

Having described my invention, I desire to claim and to secure by Letters Patent—

1. In a hand-cultivator, the construction of the frame in two self-contained parts joined together by pivoted arms, one pair of which is longer than the other, and one member of each pair connected to one member of the other pair, so as to allow only parallel movements thereof, substantially as described.

2. A cultivator having a frame composed of two parts movable toward and from each other, each part being provided with a pivoted arm adjacent to its front and rear end extending toward the other part, the said arms of the opposing parts being pivoted directly together, connections between the front and rear arms of each part, to secure the simultaneous movement of said arms, a locking device for securing said arms rigidly in the positions to which they may be adjusted and a handle secured to each of said parts, substantially as described.

3. A cultivator having a frame composed of two parts, each part comprising a cultivator-bar, a handle and a supporting-wheel, of a pair of arms pivoted together and having their outer ends pivotally secured to said parts adjacent to their forward ends; a second pair of arms, pivoted together and having their outer ends secured to said handles adjacent to their rear ends, links connecting each of said front arms with its corresponding rear arm, said links being substantially parallel to said handles and a locking device for securing said arms in the positions to which they may be adjusted, substantially as described.

4. A cultivator having its frame composed of two parts movable toward and from each other, each part comprising a cultivator-bar, a supporting-wheel, a handle and a vertically-disposed spindle, a pair of front arms pivoted together and having their outer ends pivotally engaging the spindles of the said parts, a pair of rear arms, of greater length than the front arms, pivoted together and having their outer ends pivoted to said handles, links extending from said front arms to the rear arms, and lying substantially parallel to the said handles, and a locking device for securing said arms rigidly in the positions to which they may be adjusted, substantially as described.

5. A cultivator having a frame composed of two parts movable toward and from each other, a pair of front arms pivoted together and having their outer ends pivotally connected to said parts adjacent to their front ends, a second pair of arms of greater length than said front arms pivoted together and having their outer ends pivotally connected to said parts adjacent to their rear ends, and a connection extending from one of said front arms to the corresponding rear arm, and connected to said front and rear arms at points substantially equally distant from the points of pivoting of said arms to the adjacent part of the cultivator-frame, substantially as described.

GEORGE L. ROBY.

Witnesses:
JACOB BAAR,
L. F. ROBY.